June 11, 1968 P. BIRMAN 3,388,317
VOLTAGE LIMITING CIRCUIT FOR REGULATED POWER SUPPLY
Filed Aug. 18, 1965

INVENTOR.
PAUL BIRMAN
BY
*Alfred W. Barber*
ATTORNEY

United States Patent Office 3,388,317
Patented June 11, 1968

3,388,317
VOLTAGE LIMITING CIRCUIT FOR REGULATED POWER SUPPLY
Paul Birman, Flushing, N.Y., assignor to Forbro Design Corp., New York, N.Y., a corporation of New York
Filed Aug. 18, 1965, Ser. No. 480,587
3 Claims. (Cl. 323—22)

ABSTRACT OF THE DISCLOSURE

The present invention is a circuit for limiting the load voltage of a regulated power supply by means of a Zener diode. By placing the Zener diode in the regulator circuit, only a small amount of current flows through the Zener even when limiting the output voltage of a regulated power supply when large amounts of output power are being supplied.

---

The present invention concerns regulated power supplies and, in particular, methods of and means for limiting the output voltage of such supplies.

Regulated power supplies are devices designed to accept an alternating current input which may have a variable amplitude and providing a direct current output of constant amplitude. More specifically the output may be regulated to provide a constant voltage or a constant current. These supplies include: rectifiers for converting the alternating current input to direct current; filters for reducing ripple voltages of the rectified direct current; and regulating devices for automatically offsetting changes in output voltage or current caused by changes in the amplitude of the input alternating current or changes in the load resistance. One effective circuit for a regulated power supply is shown and described in U.S. Patent No. 3,028,538 to which reference is made for a detailed description of the circuit to be shown herein as the basis for the present invention.

Regulated power supplies are used where constant voltage or constant current are required. The regulated power supplies in accordance with the present invention not only provide a regulated output but also have provisions for adjusting the output from some rated maximum value down to zero. There are times when it is desirable to provide an upper limit for the output voltage as well. Circuits which may experience costly damage when subjected to excess voltage require some definite provision to insure that the power supply output will not exceed such voltage. For example, a power supply having a maximum output capability of 100 volts may be used on a circuit at 0–25 volts but the circuit may be damaged by any voltage in excess of 50 volts. The present invention concerns methods of and means for insuring that the voltage will not go above the assumed 50 volt limit even if the operator inadvertently advances the power supply control beyond the 50 volt point. A Zener diode is a semiconductor device with a sharply non-linear voltage-current characteristic suitable for voltage limiting applications. Such a diode across the power supply terminals could be used for limiting the output voltage, but if used with a high power supply, the Zener would have to be of very high power dissipation capacity and would be expensive.

In accordance with the present invention a Zener diode is used in the regulated power supply circuit connected in such a way as to effectively limit the output voltage but also in such a way as to require very little power dissipation even in a high current power supply. This output voltage limiting Zener is connected to the regulating circuit where the current is constant and relatively low at all times. In the voltage regulating circuit the Zener is placed across the voltage control resistor. Since in this circuit the voltage across this resistor is equal to the load voltage, the Zener is chosen to have a firing voltage equal to the voltage at which limiting is required. To obtain regulated current from the power supply in accordance with the present invention the load is replaced by a current sensing resistor and the load is connected in series with the return lead of the unregulated voltage source. With this current regulating circuit, load voltage limiting is obtained by placing the limiting Zener across the load and current control resistor in series. As for the regulated voltage case, the voltage limiting Zener is required to carry only a relatively small predetermined current when acting as a limiter even in the case of a high current power supply.

Accordingly, one object of the present invention is to provide methods of and means for limiting the output voltage of regulated power supplies in such a manner as to not require absorption of the output of the power supply by the limiting means.

Another object is to provide voltage limiting of current regulating power supplies.

Still another object is to provide voltage limiting of voltage or current regulating power supplies by means which are not connected directly across the actual load being protected.

These and other objects will be apparent from the detailed description of the invention given in connection with the various figures of the drawing.

Figure 1:
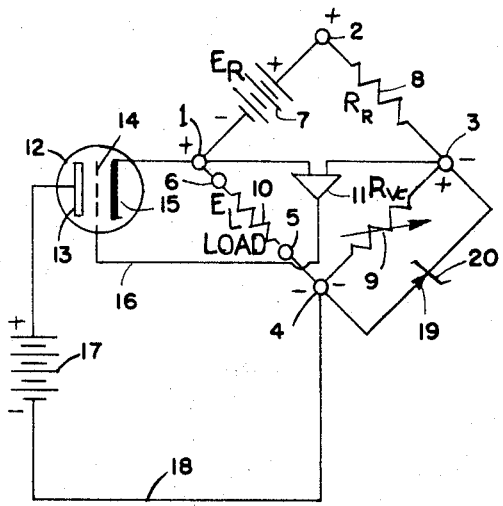
FIGURE 1 is a schematic circuit diagram of the present invention as applied to a circuit using a thermionic vacuum tube as the pass device and operating as a voltage regulator.

FIGURE 1 shows a control bridge circuit connected to the four terminals 1, 2, 3 and 4 and including a load 10 across which appears load voltage $V_L$ connected between terminals 5 and 6 which in turn are connected to bridge terminals 4 and 1; reference voltage source 7 having a voltage $E_R$ connected between terminals 1 and 2, reference resistor 8 having a resistance value $R_R$ connected between terminals 2 and 3, and adjustable voltage control resistor 9 having a resistance value $R_{VC}$ connected between terminals 3 and 4. As set forth in the above referenced patent this bridge is in balance when $E_L/E_R = R_{VC}/R_R$ where $E_L$ is the load voltage, $E_R$ is the reference voltage, $R_{VC}$ is the resistance of the voltage control resistor and $R_R$ is the resistance of the reference resistor. At balance, no voltage, in other words, a null exists between common terminal 1 and the diagonal terminal 3. The unregulated voltage ordinarily supplied by a conventional alternating current rectifier and filter combination is generally represented by battery 17. The cathode 15 of pass tube 12, heated by conventional means not shown, is connected to the bridge common terminal 1 and plate 13 is connected to the positive end of unregulated source 17. The negative end of unregulated source 17 is returned over lead 18 to bridge terminal 4 which corresponds with load terminal 5. As stated above this circuit regulates so that $E_L/E_R = R_{VC}/R_R$. When an unbalanced condition exists, the resulting voltage terminals 1 and 3 is amplified by amplifier 11 and is applied to the grid control electrode 14 of the thermionic vacuum tube pass device 12 in such a polarity as to cause pass tube 12 to absorb more or less voltage as is required to reestablish the balance and so to provide the predetermined voltage to the load in accordance with the above equation. It is also true that the voltage across the reference resistor is equal to the reference voltage and the voltage across the voltage control resistor is equal to the load voltage when the circuit is regulating and the bridge is balanced.

It has been found, in accordance with the present invention, that if a voltage limiting device such as a Zener diode is connected in the proper polarity across voltage control resistor 9 that the output voltage across load 10 can never exceed the limiting voltage of the Zener. A Zener diode including anode 19 and cathode 20 is connected across voltage control resistor 9 with anode 19 connected to bridge terminal 4 and cathode 20 connected to bridge terminal 3 so that when the voltage drop across the voltage control resistor tends to exceed the Zener limiting voltage this Zener conducts and limits. Thus, the maximum voltage across the voltage control resistor 9 will be equal to the Zener voltage as will also be the maximum programmable voltage across the load 10. At balance the current entering terminal 3 from the upper half of the bridge through resistor 8 is equal to the current leaving terminal 3 and entering the lower half of the bridge through resistor 9 and Zener 19–20 since at balanced a null exists between terminals 1 and 3 and substantially no current passes to amplifier 11 from terminal 3. This current is equal to $E_R/R_R$ is constant and predetermined and small compared to the maximum current which the unregulated source 17 is capable of supplying. Thus the limiting by Zener 19–20 can be accomplished by a low power Zener compared with that which would have been required had a limiting Zener been placed across the load. This is especially advantageous in design procedures since the control bridge circuit is designed for a predetermined current but the same bridge circuit is usually applied to power supplies having a wide range of output current capabilities.

Figure 2:
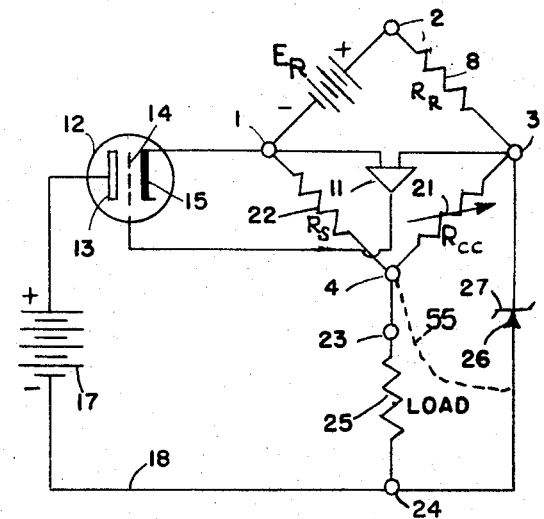
FIGURE 2 is a schematic circuit diagram of the present invention as applied to a circuit using a thermionic vacuum tube as the pass device and operating as a current regulator.

FIGURE 2 is similar to FIGURE 1 except it has been modified for current regulating function. A current sensing resistor 22 is connected between bridge terminals 1 and 4 across which will appear a voltage $E_S$ and the load 25 is connected between terminals 23 and 24 where terminal 23 is connected to bridge terminal 4 and terminal 24 is connected to the unregulated voltage source return lead 18. The adjustable resistor 21 connected between bridge terminals 3 and 4 acts now as a current control resistor $R_{CC}$. Sensing resistor 22 ($R_s$) carries the load current plus the "bridge current" while control resistor 21 ($R_{CC}$) carries the "bridge current" only. The bridge is balanced and the circuit regulates as set forth above so that $E_s/E_R = R_{CC}/R_R$. Substituting "bridge current" ($I_B = E_R/R_R$) and sensing current ($I_L + I_B = E_s/R_S$) in the above equation yields $R_s(I_L+I_B)/I_B R_R = R_{CC}/R_R$. A voltage limiting Zener diode 26, 27 connected across current control resistor 21 as shown by the dotted line 55 will serve to inhibit current to the load when the voltage across current control resistor 21 equals the Zener voltage of diode 26 in the same manner as set forth in voltage limiting above. In this case the Zener voltage should equal $I_B R_{CC}$ at the limiting current in accordance with the equation: $I_B R_{CC} = E_S = R_S) I_L + I_B)$.

When Zener 26–27 is connected across the load resistance 25 and the current control resistance 21 in series from terminal 24 to terminal 3 as shown by the solid lines, effective limiting of the voltage across the load is provided. In this case the Zener voltage to be chosen is substantially the voltage at which limiting of the voltage across the load is to be provided since the voltage across $R_{CC}$ is generally small by comparison. When the Zener voltage is exceeded by the load voltage plus the small current control voltage across $R_{CC}$, current flows from terminal 3 through the Zener and as soon as this current equals and starts to exceed the current arriving at terminal 3 through reference resistor 8, the error amplifier 11 provides an inhibiting signal to grid 14 and no further current is passed by control tube 12. This current through Zener 26–27 required to inhibit or limit the supply of further current to the load is equal to $E_R/R_R$ as set forth above. This is normally a small and predetermined current so that the power requirement for Zener 26–27 is small and also predetermined even in circuits capable of supplying high output current.

Figure 3:
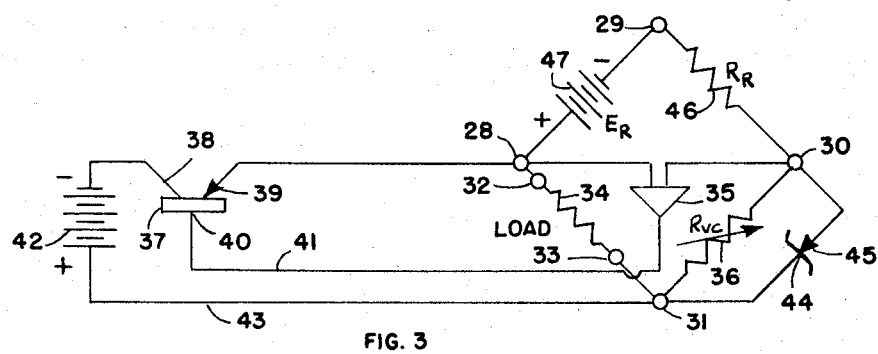
FIGURE 3 is similar to FIGURE 1 except the pass device is a transistor.

FIGURE 3 is a circuit which functions in essentially the same manner as FIGURE 1 except in this case the series pass deivce is a PNP transistor and all voltage polarities are reversed. If an NPN transistor were used as the series pass device, the voltage polarities would be the same as for the thermionic vacuum tube of FIGURE 1.

In FIGURE 3 the control bridge comprises the four terminals 28, 29, 30 and 31 with a reference voltage 47 connected between terminals 28 and 29, a reference resistor 46 connected between terminals 29 and 30, an adjustable output voltage control resistor 36 connected between terminals 30 and 31 and a load resistor 34 connected between output terminals 32 and 33 which in turn are connected to terminals 28 and 31 respectively. In this case the source of unregulated voltage is represented by battery 42 although it will be understood that an AC line transformer, rectifier and filter will supply this voltage in most actual cases. The error amplifier 35 is provided with its input connected between common terminal 28 and the diagonal bridge terminal 30 and its output connected over lead 41 to base 40 of the series pass control transistor 37. The collector 38 of transistor 37 is connected to the negative end of voltage source 42 and emitter 39 is connected to common terminal 28. The positive end of voltage source 42 is returned over lead 43 to bridge terminal 31 which is also connected to one of load resistor 34 at terminal 33. The voltage limiting function in this case is supplied, as in the case of FIGURE 1, by Zener diode 44–45 connected across the voltage control resistor 36 with cathode 44 connected to terminal 31 and anode 45 connected to terminal 30. When the Zener voltage of Zener diode 44–45 is chosen to equal the voltage at which the load voltage is to be limited, the circuit functions in the same manner to provide this limiting as for FIGURE 1 as described in detail above.

Figure 4:
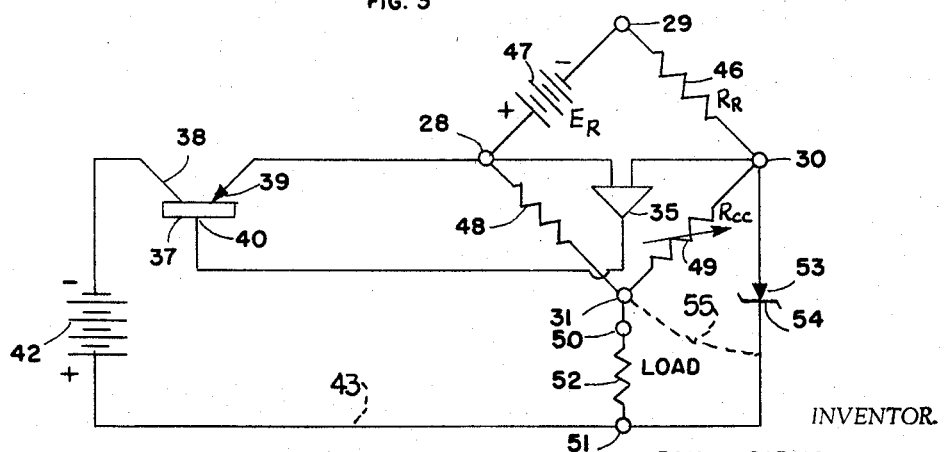
FIGURE 4 is similar to FIGURE 2 except the pass device is a transistor.

FIGURE 4 shows the current limiting and voltage limiting of a current regulating circuit similar to the circuit of FIGURE 2 except that the pass device is a PNP transistor and all voltage polarities are reversed. The load 52 is connected between output terminals 50 and 51 which are in turn connected to bridge terminal 31 and return lead 43 respectively. An NPN transistor could be used for the series pass device by reversing the polarities of the various voltages of the system. The circuit of FIGURE 4 functions as set forth above in connection with FIGURE 2 such that when the cathode 54 of the Zener diode is connected to terminal 31 instead of terminal 51 as indicated by dotted line 55, the circuit operates as a current limited and when cathode of the Zener diode 54 is connected to terminal 51 as shown by the solid line, the system limits the maximum voltage across the load. To be precise the Zener diode acts to cause the bridge to limit further voltage across the load when the sum of the voltages across load 52 and current control resistor 49 just equals the Zener limiting voltage. Generally the load voltage is high compared to the current sampling voltage so that the voltage limiting is closely equal to the load voltage.

While only a few forms of the present invention have been shown and described, many modifications will be apparent to those skilled in the art and within the spirit and scope of the invention as set forth in particular in the appended claims.

What is claimed is:

1. In a regulated power supply, the combination of, a first and a second terminal between which are connected the following branch circuits; a source of reference voltage and a reference resistor in series; the input circuit to a control amplifier having a signal output circuit; a current sensing resistor and an adjustable load current control resistor joined together at a third terminal and in series; and a signal responsive control means in series with a source of direct current and a load resistor connected between one of the first two said terminals and said third terminal; and a signal carrying connection between said output of said amplifier and said signal responsive means; and a Zener diode connected between the other of said two terminals and the end of the load resistor remote from said third terminal whereby the voltage across said load resistor is limited to substantially the Zener voltage of said Zener diode.

2. A regulated power supply with a limited load voltage as set forth in claim 1 wherein said control means is a transistor.

3. A regulated power supply with a limited load voltage as set forth in claim 1 wherein said control means is a thermionic vacuum tube.

References Cited

UNITED STATES PATENTS

| | | | |
|---|---|---|---|
| 3,028,538 | 4/1962 | Rosenfeld et al. | 323—22 |
| 3,214,706 | 10/1965 | Mollinga | 307—88.5 X |

LEE T. HIX, *Primary Examiner.*

WARREN E. RAY, *Examiner.*

A. D. PELLINEN, *Assistant Examiner.*